US009659080B1

(12) United States Patent
Drobychev et al.

(10) Patent No.: US 9,659,080 B1
(45) Date of Patent: May 23, 2017

(54) CATEGORIZATION FOR CONSTRAINT-BASED PLACEMENT OF OBJECT REPLICAS IN A DISTRIBUTED STORAGE SYSTEM

(71) Applicant: Google Inc., Mountain View, CA (US)

(72) Inventors: Alexandre Drobychev, San Mateo, CA (US); Michael O'Reilly, Lindfield (AU); Mark Waldron, Chatswood West (AU)

(73) Assignee: GOOGLE INC., Mountain View, CA (US)

( * ) Notice: Subject to any disclaimer, the term of this patent is extended or adjusted under 35 U.S.C. 154(b) by 424 days.

(21) Appl. No.: 13/873,132

(22) Filed: Apr. 29, 2013

(51) Int. Cl.
*G06F 17/30* (2006.01)

(52) U.S. Cl.
CPC .. *G06F 17/30598* (2013.01); *G06F 17/30215* (2013.01); *G06F 17/30575* (2013.01)

(58) Field of Classification Search
CPC ......... G06F 17/30212; G06F 17/30067; G06F 17/30575; G06F 17/30; G06F 17/30091; G06F 17/30578; G06F 17/30598
USPC .......................... 707/610, 626, 637, 736–737
See application file for complete search history.

(56) References Cited

U.S. PATENT DOCUMENTS

| | | | | |
|---|---|---|---|---|
| 6,463,454 | B1* | 10/2002 | Lumelsky | G06F 9/5083 |
| | | | | 707/E17.12 |
| 8,732,517 | B1* | 5/2014 | Stefani | G06F 17/30584 |
| | | | | 707/610 |
| 9,158,460 | B2* | 10/2015 | Park | G06F 3/0608 |
| 2001/0007103 | A1* | 7/2001 | Breiter et al. | 707/1 |
| 2007/0022129 | A1* | 1/2007 | Bahar | G06F 9/5011 |
| 2010/0274762 | A1* | 10/2010 | Murphy et al. | 707/636 |
| 2011/0055156 | A1* | 3/2011 | Roberts | G06F 11/2094 |
| | | | | 707/626 |
| 2011/0196664 | A1* | 8/2011 | Zunger | G06F 13/10 |
| | | | | 703/21 |
| 2011/0196832 | A1* | 8/2011 | Zunger et al. | 707/634 |
| 2011/0196834 | A1* | 8/2011 | Kesselman | 707/634 |
| 2011/0225122 | A1* | 9/2011 | Denuit | G06F 17/30174 |
| | | | | 707/634 |
| 2012/0166394 | A1* | 6/2012 | Kim | G06F 17/30575 |
| | | | | 707/634 |

(Continued)

*Primary Examiner* — Michelle Owyang
(74) *Attorney, Agent, or Firm* — Morgan, Lewis & Bockius LLP

(57) ABSTRACT

A location assignment daemon (LAD) manages placement of object replicas in a distributed storage system. The distributed storage system may include a plurality of instances, which may be at distinct geographic locations. The LAD determines placement categories for objects stored in the distributed storage system. A placement category for an object corresponds to the object's placement policy and current replica locations. There are substantially fewer placement categories than objects. The LAD determines an action plan for each placement category whose associated objects require either creation or removal of object replicas. Each action plan includes either creating or removing an object replica. The LAD prioritizes the action plans and implements at least a subset of the action plans in priority order in accordance with available resources in the distributed storage system. Each action plan is applied to objects in the placement category corresponding to the action plan.

16 Claims, 11 Drawing Sheets

(56) References Cited

U.S. PATENT DOCUMENTS

| | | | |
|---|---|---|---|
| 2012/0173486 A1* | 7/2012 | Park | H04L 67/1095 707/634 |
| 2012/0331249 A1* | 12/2012 | Benjamin | G06F 3/0607 711/162 |
| 2015/0169612 A1* | 6/2015 | Kashyap | G06F 3/06 707/692 |

* cited by examiner

Object List Implementations

CATEGORIZATION FOR CONSTRAINT-BASED PLACEMENT OF OBJECT REPLICAS IN A DISTRIBUTED STORAGE SYSTEM

TECHNICAL FIELD

The disclosed implementations relate generally to placing objects in a distributed storage system.

BACKGROUND

The enterprise computing landscape has undergone a fundamental shift in storage architectures in which the central-service architecture has given way to distributed storage systems. Distributed storage systems built from commodity computer systems can deliver high performance, availability, and scalability for new data-intensive applications at a fraction of cost compared to monolithic disk arrays. To unlock the full potential of distributed storage systems, data is replicated across multiple instances of the distributed storage system at different geographical locations, thereby increasing availability and reducing network distance from clients.

In a distributed storage system, objects are dynamically placed in (i.e., created in, deleted from, and/or moved to) various instances of the distributed storage system based on constraints. Existing techniques such as linear programming may be used to determine the placement of objects subject to these constraints for small-scale distributed storage systems. However, there are few existing techniques for efficiently placing objects that are subject to constraints in a planet-wide distributed storage system that stores trillions of objects and petabytes of data, and includes dozens of data centers across the planet.

One approach is to scan all object metadata, decide on the action for each individual object, and execute that action right away. However, this approach doesn't ensure timely satisfaction of placement constraints. For example, scanning trillions of objects could require weeks. In addition, this approach makes it difficult to achieve good utilization of resources (e.g., the density of objects that require action may vary widely across the whole set of objects).

SUMMARY

Disclosed implementations use a novel highly scalable scheme to reach and maintain satisfaction of object replica placement constraints for a large number of objects (e.g., trillions or quadrillions) without having to scan over all those objects periodically. The scheme is based on dividing all objects into a manageable set of categories (e.g., millions), so that all objects in the same categories have exactly the same set of possible actions (e.g., replica creation or deletion) required in order to satisfy their replica placement constraints. In particular, this includes the most common case, which is a category that requires no action at all. The process responsible for replica placement (e.g., in some implementations, the location assignment daemon, or LAD) periodically scans all categories and chooses the actions to execute. The process ensures that (a) more important actions are executed first, and (b) no system components involved in execution of those actions get overloaded.

Implementations of this invention utilize metadata for each object, which specifies the placement policy for the object and the current locations of all replicas of the object. A placement policy is a set of constraints imposed on the number and locations of object replicas. Typically, there are a limited number of different placement policies in the system. The object metadata provides enough information to determine if the object satisfies its placement policy. When an object does not satisfy its placement policy, the metadata provides enough information to generate a set of one or more actions (e.g., replica additions or removals) that should lead to satisfaction of the policy. This process is repeated (e.g., identifying action plans, executing one or more of the suggested actions, then re-evaluating) and "converges" toward a point where no more actions are needed (i.e. all constraints are satisfied, or their satisfaction is impossible). The disclosed distributed storage system is dynamic, with new objects uploaded continuously.

Consider the following example of a distributed storage system with three instances (e.g., data centers). Location XX in North America and locations YY and ZZ in Europe. Consider an object that has a replica in XX and a replica in YY, and the object has a placement policy that specifies "2 replicas in Europe only." The first action will be to create a new replica at ZZ, which may be copied from either XX or YY. That is, the options are "copy from XX to ZZ" or "copy YY to ZZ". The choice between these options can depend on network or other resource considerations. After one of these options is executed, the next option is to "remove XX". At that point, the object's placement policy is satisfied, with replicas in YY and ZZ.

Although the above example was described with respect to a single object, the same actions would apply to any objects that have the same placement policy ("2 replicas in Europe only') and the same two starting locations (XX and YY). Therefore, disclosed implementations divide all objects into categories so that all objects in the same category have the same set of replica locations and the same replica placement constraints. Typically the assigned category is unique so that a single object belongs to exactly one category. In the above example, the object starts in the "XX+YY:2-in-Europe" category, then moves to "XX+YY+ZZ:2-in-Europe" and finally reaches category "YY+ZZ:2-in-Europe". At any given moment the object's category can be determined from the object's metadata. Some implementations store the determined category along with the other metadata. A property of categories is that all objects in the same category share the same of actions. Another property of categories is that a successfully executed action changes the object's category, because it changes the set of replica locations.

The overall scheme includes: (a) maintaining a mapping between categories and objects (weak eventual consistency of this mapping with object metadata is ok); and (b) iterating a process that includes the following operations: (c) reading categories and generating a set of actions for each category read, resulting in a set of (category, action) pairs, which are sometimes called action plans; (d) when some action plans are more important than others, assign a priority to each action plan and sort the action plans by priority; and (e) execute the action plans in priority order, maximizing utilization of resources and preventing overload of those resources. In implementations that read all categories in operation (c), there is an empirical limit on the total number of categories in order to read and process all categories periodically. In some implementations, it is practical to have a few million categories and process them once every few minutes. In some implementations, some of the categories are omitted in at least some of the cycles (e.g., the categories that are known to have objects that fully satisfy their placement policy).

Some implementations have a resource usage accounting scheme. For example, there are queues of pending replica creation, so the location assignment should not queue up the same replication (or a similar replication for the same object) a second time before the first replication operation is complete. In addition, some implementations keep track of the count of pending copies, separately for each (source, destination) pair and execute in such a way that this count stays under a certain threshold at all times. The exact threshold value is generally not critical. It is typical for a system to show a large plateau on the "throughput vs. number of pending operations" chart.

In general, the execution scheme for a category has a specific set of resources required for its execution, which are independent of the particular object selected for the operation. For example, the action "copy from XX to YY" depends on the resources at XX, the resources at YY, and the link from XX to YY. The execution algorithm can thus iteratively pick the next highest priority plan such that all resources required for the action are currently under their respective thresholds, and pick the next object from the category to execute the action. In some implementations, additional degrees of control may be achieved by injection of artificial resources into the set of plans. For example, some implementations limit the total number of simultaneous replica additions performed by the system by adding the artificial resource "replica-addition" to the set of requirements of every action plan that creates new replicas.

In some implementations, replica removals are permitted only after verification of at least one surviving replica. In the example above, the replica at XX needs to be removed for objects in the "XX+YY+ZZ:2-in-Europe" category. Two execution options are generated: one to "verify YY, remove XX", and the other to "verify ZZ, remove XX".

Successful execution of an action plan moves an object to a different category, thus ensuring that the object doesn't get inspected over and over again in the same state. Execution failures, on the other hand, are unproductive. A failure does not contribute to overall constraint satisfaction and results in wasted resources to reprocess the same object during the next cycle. Therefore, some implementations monitor for and prevent execution failures when possible. In some implementations, an action plan (or a specific execution option within an action plan) is eliminated in the planning step if a high failure rate is expected in advance. For example, if the XX instance is experiencing problems, then "copy XX to YY" is excluded as an option. In some implementations, a high failure rate is expected based on the observed failure rate for prior attempts.

Execution of actions for large objects may take considerable time, possibly longer than the duration of a single cycle. If such an object stays in its original category until the action is complete, it may be repetitively inspected during multiple cycles, which is wasteful. Some implementations avoid this problem by adding the information about pending actions to the object's metadata, and place the object in a different category based on the pending action. For example, if an object is currently at locations XX and YY, has placement policy "2 in Europe," and is currently copying a replica from location XX to ZZ, some implementations put that object in category "XX+YY:pending-copy-XX-to-ZZ: 2-in-Europe." This implementation strategy results in an increase in the overall number of categories, which may not be desirable. In other implementations, the expected conservative completion time of the action is added to the metadata as well. Some implementations create one or more special holding categories for such objects, such as "hold-until-T", where T is a quantized action execution deadline (e.g., rounded up to the next hour boundary). In these implementations, no action plans are generated for these special categories until the time T is reached. When the time T is reached, the action plan is to "re-categorize the objects".

In some implementations, the large number of stored objects may necessitate multiple execution workers or threads, each performing the operations described above. In this case, some implementations have an additional algorithm to make sure that multiple workers don't work on the same object at the time. Some implementations address this by distributing the categories to distinct workers. In some implementations, the worker assigned to a category is based on a hash of the category. For example, a category with key C (e.g., "XX+YY:2-in-Europe") is processed by the worker whose index is hash(C) modulo N, where N is the total number of workers. For certain very large categories, the processing have to be split across multiple workers for a single category. Some implementations assign every such category to a worker that acts as a "split master" for that category. (This assignment can be based on the hash method just described.). Each worker executes action plans generated for the category, but when it needs to get the next object from that category for plan execution, it asks the split master to provide that object. In some implementations, the cross-worker network traffic is reduced by requesting multiple objects from the split master at once and then buffering those objects in memory.

According to some implementations, a location assignment daemon (LAD) manages placement of object replicas in a distributed storage system. In some implementations, the distributed storage system includes a plurality of instances. In some implementations, the instances are at distinct geographic locations. The LAD determines placement categories for objects stored in the distributed storage system. A placement category for an object corresponds to the object's placement policy and current replica locations. In some implementations, each object corresponds to a unique category based on the object's placement policy and current locations of replicas of the object. In some implementations, each placement policy specifies a target number of replicas and a target set of locations for replicas. In some implementations, for at least a subset of the placement policies, the target number of replicas or the target locations for replicas depends on how recently an object was accessed, and wherein determining placement categories for the plurality of objects further corresponds to how recently each respective object was accessed. There are substantially fewer placement categories than objects.

The LAD determines an action plan for each placement category whose associated objects require either creation or removal of object replicas. Each action plan includes either creating or removing an object replica. The LAD prioritizes the action plans. In some implementations, prioritizing the action plans is determined, at least in part, by how closely objects in the corresponding category satisfy the category's placement policy. In some implementations, at least one action plan has a plurality of distinct execution options and the execution options are prioritized at run-time based on one or more network factors or resource considerations. In some implementations, the LAD monitors for execution failures, and when the number of execution failures for a first execution option exceeds a threshold, the LAD decreases prioritization of the first execution option.

The LAD implements at least a subset of the action plans in priority order in accordance with available resources in the distributed storage system. Each action plan is applied to objects in the placement category corresponding to the action plan. In some implementations, implementing at least a subset of the action plans comprises includes (a) selecting an action plan according to priority and resource considerations, (b) selecting an object in the category corresponding to the action plan; and (c) dispatching a command to execute the action plan on the selected object, thereby adding or removing a replica of the selected object, and increasing satisfaction of the placement policy by the selected object. In some implementations, the determination of an action plan for each placement category, prioritization of the action plans, and implementation of the action plans is repeated for a plurality of cycles. In some implementations, each cycle has substantially the same predefined span of time (e.g., one minute, 2 minutes, 5 minutes, 15 minutes, or an hour.) In other implementations, the span of time for each cycle varies (e.g., based on overall system load, the rate that new objects are being uploaded to the distributed storage system, or even time of day).

BRIEF DESCRIPTION OF THE DRAWINGS

Like reference numerals refer to corresponding parts throughout the drawings.

DESCRIPTION OF IMPLEMENTATIONS

Before discussing techniques for managing the placement of objects in a distributed storage system, it is instructive to present an exemplary system in which these techniques may be used.

Distributed Storage System Overview

Figure 1:
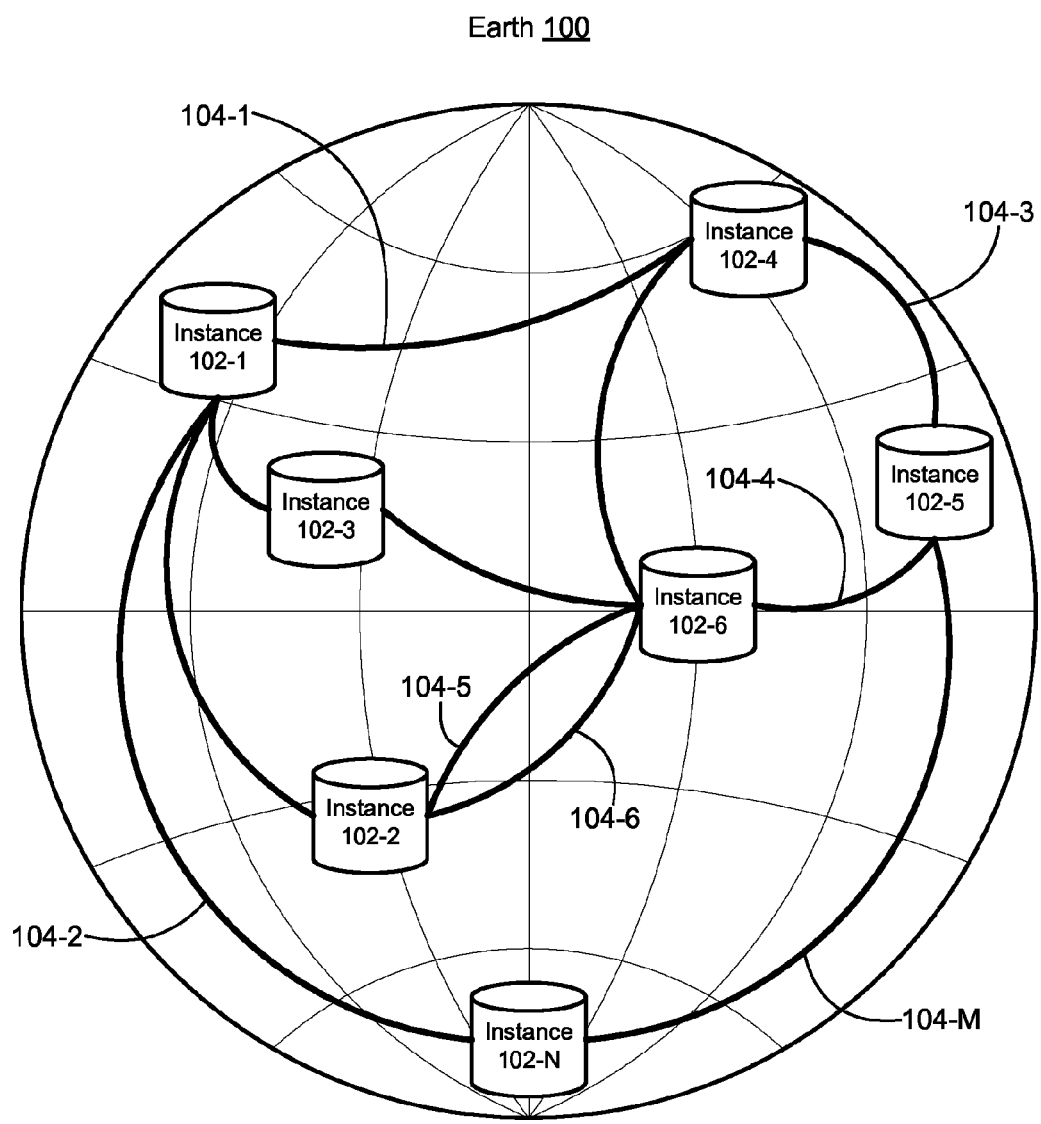
FIG. 1 is a conceptual illustration of a distributed storage system, according to some implementations.

As illustrated in FIG. 1, the disclosed implementations describe a distributed storage system. There are multiple instances 102-1, 102-2, ... 102-N at various locations on the Earth 100, connected by network communication links 104-1, 104-2, ... 104-M. Note that an "instance" is also referred to as a "storage location" in this specification. Also note that one or more instances (storage locations) may be located at a particular physical location (e.g., a building, a set of buildings within a predetermined distance of each other, etc.). In some implementations, an instance (such as instance 102-1) corresponds to a data center. In some implementations, multiple instances are physically located at the same data center. A single implementation may have both individual instances at distinct geographic locations as well as one or more clusters of instances, where each cluster includes a plurality of instances, and the instances within each cluster are at a single geographic location.

Figure 4:
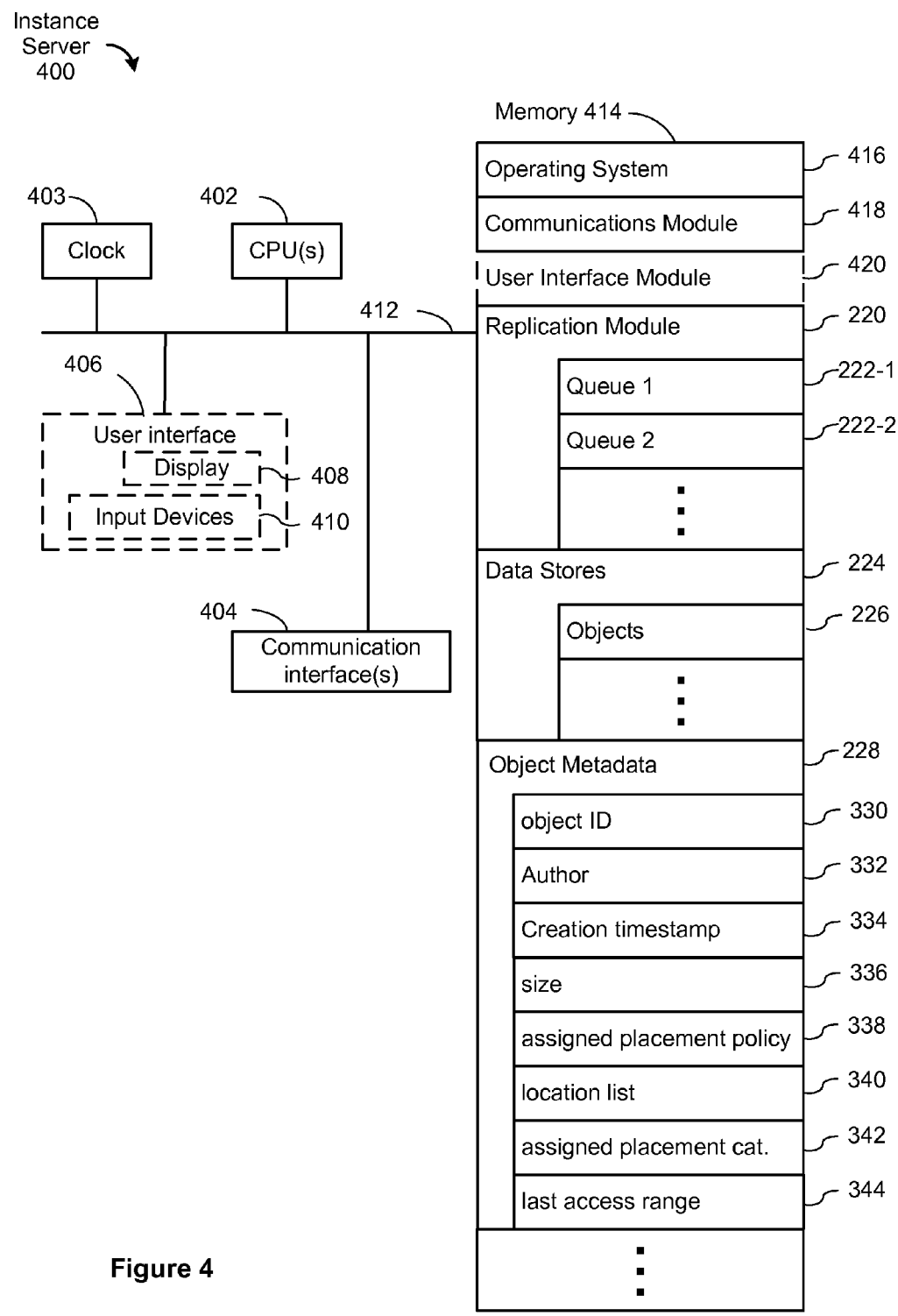
FIG. 4 is a block diagram of an instance server, according to some implementations.

Although the conceptual diagram of FIG. 1 illustrates a particular number of network communication links 104-1, etc., typical implementations may have more or fewer network communication links. In some implementations, there are two or more network communication links between the same pair of instances. For example, the network communication links 104-5 and 104-6 provide network connectivity between instance 102-2 and instance 102-6. In some implementations, the network communication links include fiber optic cable. In some implementations, some of the network communication links use wireless technology, such as microwaves. In some implementations, each network communication link has a specified bandwidth and/or a specified cost for the use of that bandwidth. In some implementations, statistics are maintained about the transfer of data across one or more of the network communication links, including throughput rate, times of availability, reliability of the links, etc. Each instance typically has data stores and associated databases, and utilizes a farm of server computers ("instance servers" as illustrated in FIG. 4) to perform all of the tasks. In some implementations, one or more instances of the distribute storage system have limited functionality. For example, the limited functionality may include acting as a repeater for data transmissions between other instances. Note that limited functionality instances may or may not include any of the data stores.

Figure 2:
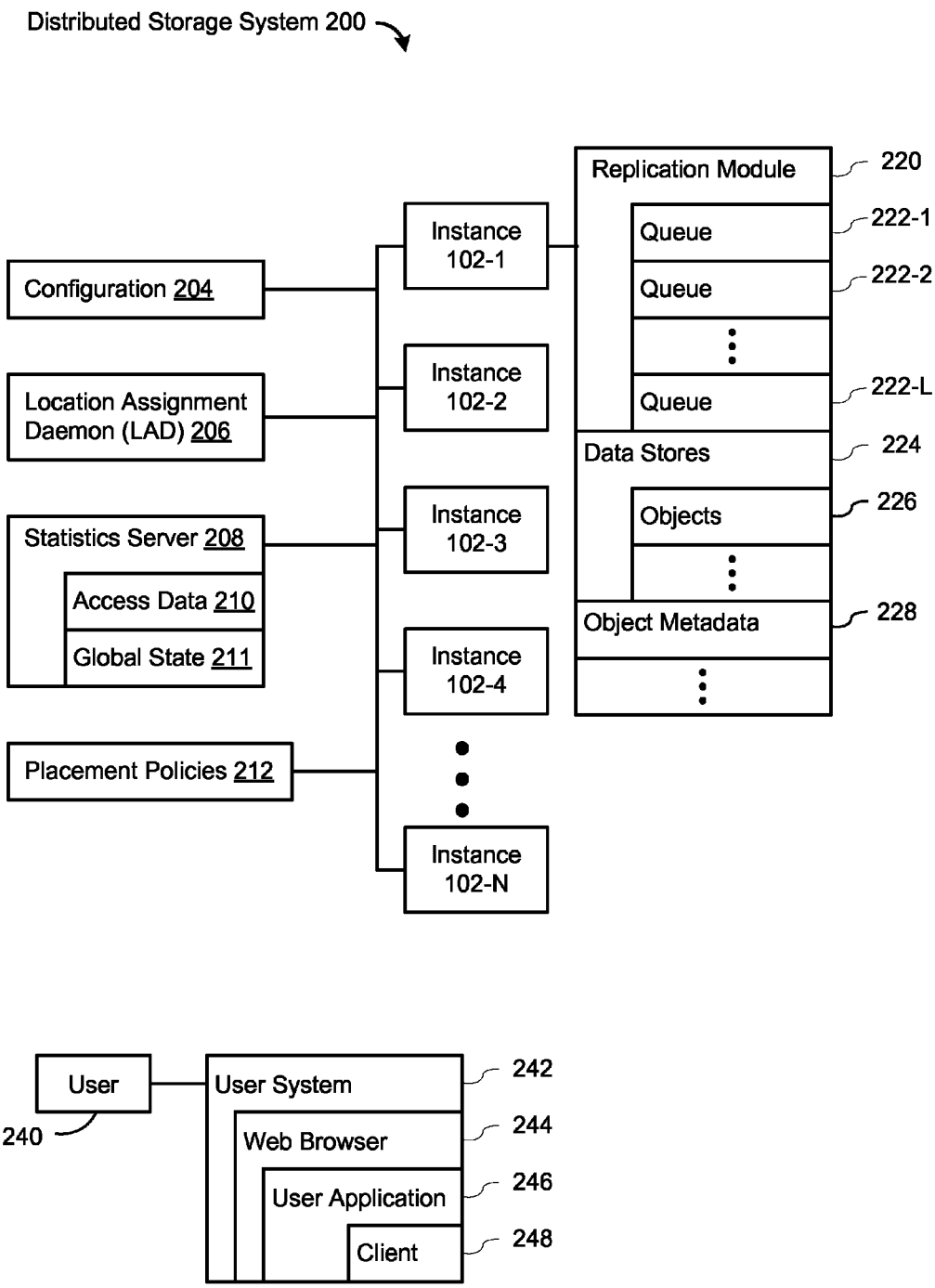
FIG. 2 is a block diagram illustrating the elements of a distributed storage system, according to some implementations.

FIG. 2 is a block diagram illustrating the elements of a distributed storage system 200, according to some implementations. The distributed storage system 200 includes instances 102-1, 102-2, 102-3, 102-4, ... 102-N. A respective instance 102-1 includes a replication module 220 that replicates objects 226 between instances. In some implementations, the objects 226 are stored in data stores 224 of the respective instance 102-1. The data stores 224 may include distributed databases, file systems, tape backups, and any other type of storage system or device capable of storing objects. In some implementations, the replication module 220 uses one or more replication queues 222-1, 222-2, ..., 222-L to replicate objects. Replication requests for objects to be replicated are placed in a replication queue 222, and the objects are replicated when resources (e.g., bandwidth) are available. In some implementations, replication requests in a replication queue 222 have assigned priorities, and the highest priority replication requests are replicated as bandwidth becomes available.

In some implementations, a background replication process creates and deletes copies of objects based on placement policies 212 and object access data 210 and/or a global state 211 provided by a statistics server 208. The placement policies 212 specify how many copies of an object are desired, where the copies should reside, and in what types of data stores the data should be saved. Using placement policies 212, together with the access data 210 (e.g., data regarding storage locations at which replicas of objects were accessed, times at which replicas of objects were accessed at storage locations, frequency of the accesses of objects at the storage locations, etc.) and/or the global state 211 provided by the statistics server 208, a location assignment daemon (LAD) 206 determines where to create new copies of an object and what copies may be deleted. When new copies are to be created, replication requests are inserted into a replication queue 222. In some implementations, the LAD 206 manages replicas of objects globally for the distributed storage system 200. In other words, there is only one LAD 206 in the distributed storage system 200. The use of the placement policies 212 and the operation of a LAD 206 are described in more detail below.

Note that in general, a respective placement policy 212 may specify the number of replicas of an object to save, in what types of data stores the replicas should be saved, storage locations where the copies should be saved, etc. In some implementations, a respective placement policy 212 for an object includes criteria selected from the group consisting of a minimum number of replicas of the object that must be present in the distributed storage system, a maximum number of the replicas of the object that are allowed to be present in the distributed storage system, storage device types on which the replicas of the object are to be stored, locations at which the replicas of the object may be stored, locations at which the replicas of the object may not be stored, and a range of ages for the object during which the placement policy for the object applies. For example, a first placement policy may specify that each object in a webmail application must have a minimum of 2 replicas and a maximum of 5 replicas, wherein the replicas of the objects can be stored in data centers outside of China, and wherein at least 1 replica of each object must be stored on tape. A second placement policy for the webmail application may also specify that for objects older than 30 days, a minimum of 1 replica and a maximum of 3 replicas are stored in the distributed storage system 200, wherein the replicas of the objects can be stored in data centers outside of China, and wherein at least 1 replica of each object must be stored on tape.

In some implementations, a user 240 interacts with a user system 242, which may be a computer system or other device that can run a web browser 244. A user application 246 runs in the web browser, and uses functionality provided by database client 248 to access data stored in the distributed storage system 200 using a network. The network may be the Internet, a local area network (LAN), a wide area network (WAN), a wireless network (WiFi), a local intranet, or any combination of these. In some implementations, the database client 248 uses information in a global configuration store 204 to identify an appropriate instance to respond to the request. In some implementations, user application 246 runs on the user system 242 without a web browser 244. Exemplary user applications include an email application and an online video application.

In some implementations, each instance stores object metadata 228 for each of the objects stored in the distributed storage system. Some instances store object metadata 228 only for the objects that have replicas stored at the instance (referred to as a "local instances"). Some instances store object metadata 228 for all objects stored anywhere in the distributed storage system (referred to as "global instances"). The metadata is described in more detail with respect to FIGS. 3 and 6.

Figure 3:
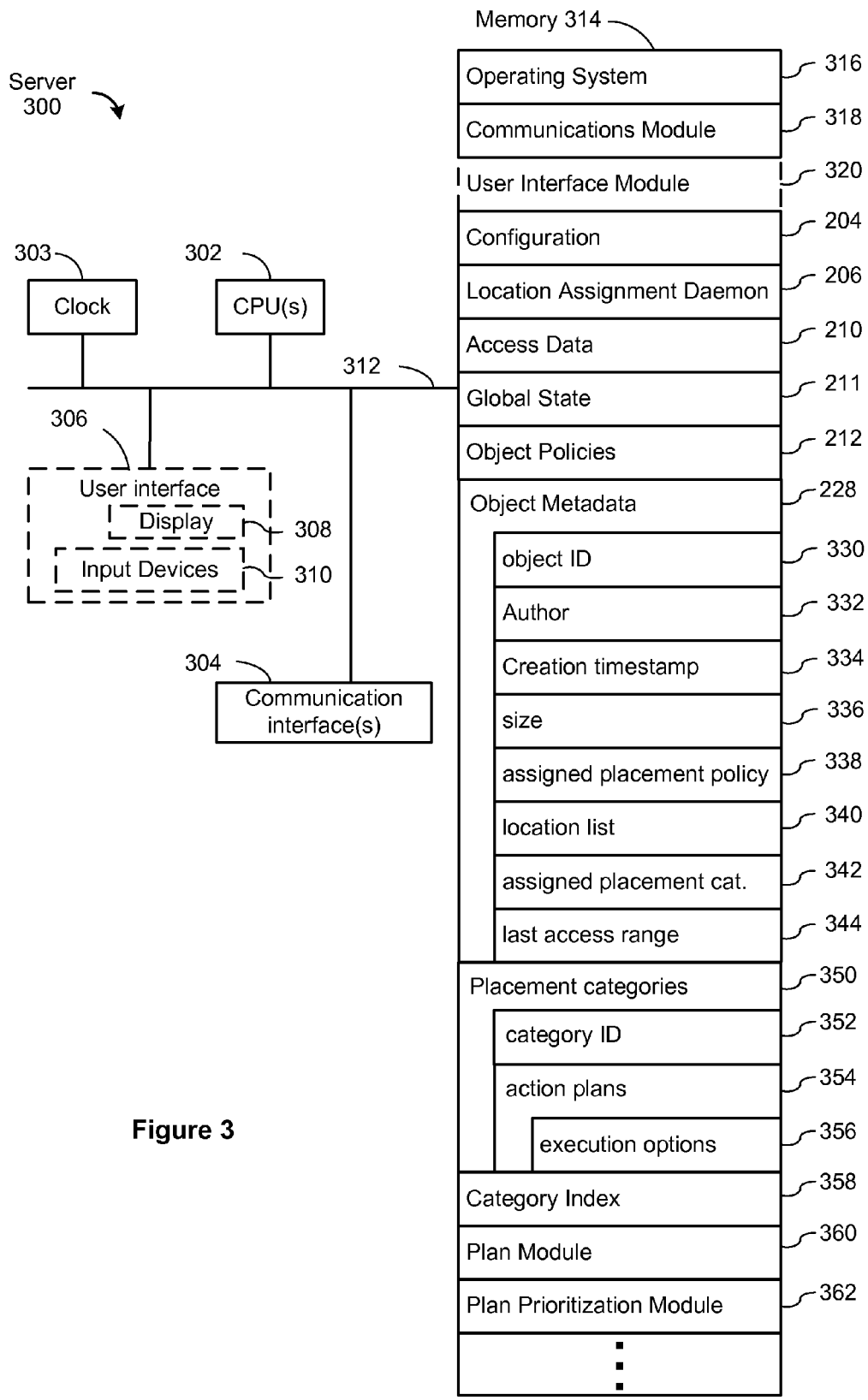
FIG. 3 is a block diagram of a server, according to some implementations.
Figure 8A:
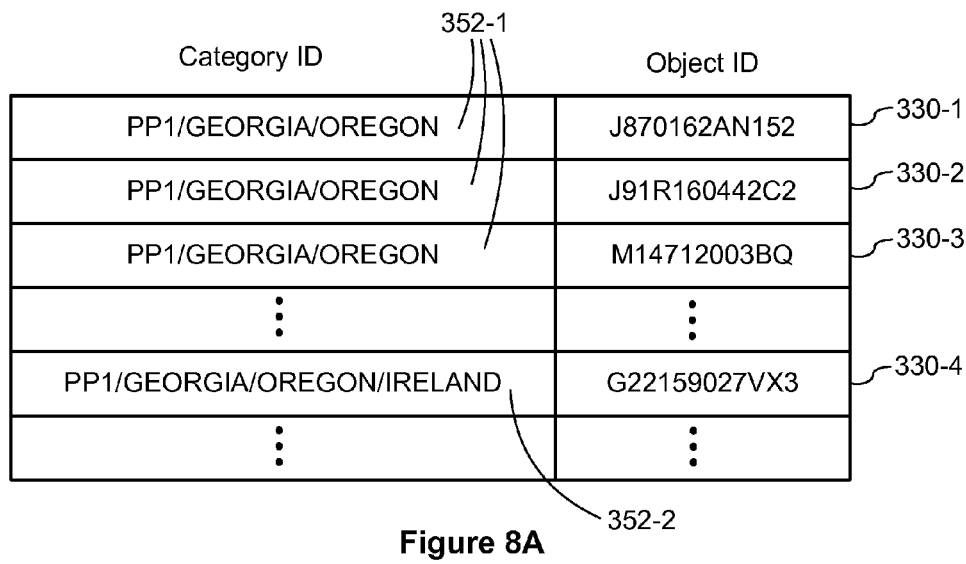
FIGS. 8A and 8B illustrate two ways to index objects within categories in accordance with some implementations.
Figure 8B:
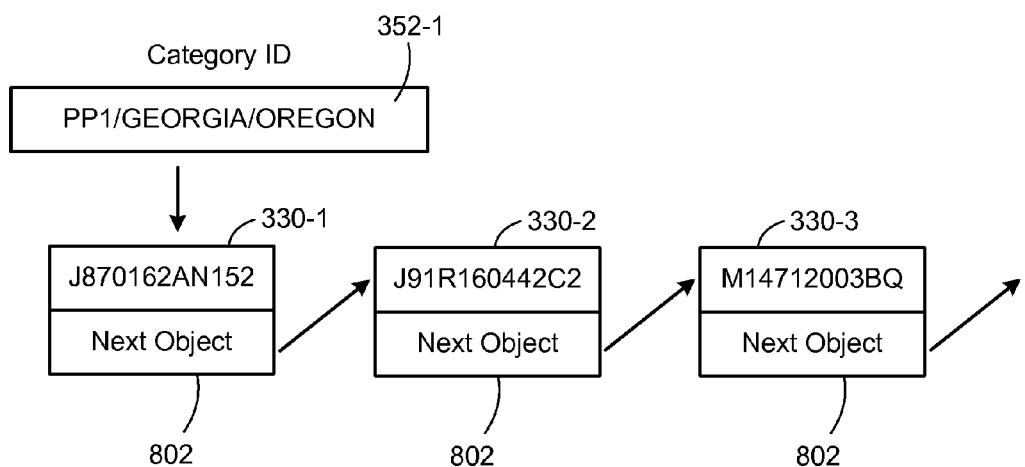

FIG. 3 is a block diagram of a server 300, according to some implementations. The server 300 typically includes one or more processing units (CPU's) 302, a clock 303 that reports the current date and/or time, one or more network or other communications interfaces 304, memory 314, and one or more communication buses 312 for interconnecting these components. The communication buses 312 may include circuitry (sometimes called a chipset) that interconnects and controls communications between system components. In some implementations, the clock 303 is a local clock that is periodically synchronized with a clock server (e.g., a quorum clock server or any other clock server on a network, etc.). The server 300 optionally may include a user interface 306 comprising a display device 308 and input devices 310 (e.g., keyboard, mouse, touch screen, keypads, etc.). Memory 314 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 314 may optionally include one or more storage devices remotely located from the CPU(s) 302. Memory 314, or alternately the non-volatile memory device(s) within memory 314, comprises a computer readable storage medium. In some implementations, memory 314 stores the following programs, modules and data structures, or a subset thereof:

- an operating system 316 that includes procedures for handling various basic system services and for performing hardware dependent tasks;
- a communication module 318 that is used for connecting the server 300 to other computers via the one or more communication interfaces 304 (wired or wireless) and one or more communication networks, such as the Internet, other wide area networks, local area networks, metropolitan area networks, and so on;
- an optional user interface module 320 that receives commands from the user via the input devices 310 and generates user interface objects in the display device 308;
- the configuration 204, as described herein;
- the LAD 206, as described herein;
- access data 210, as described herein;
- the global state 211, as described herein;
- the placement policies 212, as described herein;
- object metadata 228 for the objects stored in the distributed storage system. The object metadata 228 may include an object ID 330, which uniquely identifies the object within the distributed storage system. The metadata 228 may include the author 332 of the object, which may be a name and/or identifier of a person or entity (e.g., email address). In some implementations, the identifier is unique. The metadata may include a datestamp or timestamp 334 when the object was created (e.g., uploaded to the distributed storage system). The metadata may include the size 336 of the object, which is typically measured in bytes or allocation blocks. The metadata includes an assigned placement policy 338, which may be assigned individually or based on other criteria (e.g., all YouTube videos uploaded from the United States have the same placement policy). The usage of placement policies is described in more detail below with respect to FIGS. 5-7 and 9A-9C. The metadata 228 includes a location list 340, which identifies where replicas of the object are currently located. The metadata 228 also includes an assigned placement category 342, which is determined based on the other metadata 228. In some implementations, the assigned placement category 342 is the concatenation of the assigned placement policy 338 and the list of locations 340 (e.g., with locations sorted so that the order is unique). In some implementations, the metadata 228 includes a last access range 344. For example, there may be two ranges: accessed in the last 90 days or accessed more than 90 days ago. These could be encoded as "<=90DAYS" and ">90DAYS". The last access ranges correspond to the ranges used in the placement policies 212. Sometimes the last access ranges are referred to as showing the "temperature" of an object: a "hot" object is one that people are continuing to access, whereas a "cold" object is no longer of significant interest. In some implementations, the temperature is computed as an aggregate of multiple users, so that an item with very limited recent access is not designated as "hot." In some implementations, the last access range 344 is included in the assigned placement category (see, e.g., FIG. 7);

placement categories 350, which group together many objects that have the same placement requirements. In general, most placement categories 350 identify objects that have no immediate replication requirements. That is, the existing replicas satisfy the placement policy. But some categories 350 identify objects that require either creation of new object replicas or removal of existing replicas. Each placement category 350 has a unique category ID 352, which may be a system generated unique key or formed from other data. In some implementations, the category ID 352 is the concatenation of a placement policy 212 and a set of replica locations. For each of these categories, there is an action plan 354, which is a sequence of zero or more steps that will lead to satisfaction of the placement policy. (If the placement policy 212 for a category 350 is already satisfied by the objects in the category, then the action plan has zero steps; otherwise the number of steps is positive.) For example, an action plan 354 may require creating a new replica in Asia. For each action plan 354, there are typically two or more alternative execution options 356. For example, if the action plan 354 requires another replica in Asia, executions options 356 could include creating a new replica in Taiwan or creating a new replica in Hong Kong;

a category index 358, which is used to identify all of the objects corresponding to each category. FIGS. 8A and 8B illustrate two alternative implementations for a category index 358;

a plan module 360, which is one or more programs that determine action plans 354 and execution options 356, and select execution options based on current network and resource considerations. In some implementations, the plan module 360 is included in the location assignment daemon 206; and a plan prioritization module 362, which determines the order in which action plans are processed. For example, action plans for categories that require additional replicas are typically processed before action plans for categories that require removal of replicas. Similarly, an action plan to create a second replica would typically have a higher priority than an action plan to create a third or fourth replica. In some implementations, the plan prioritization module 362 is included in the location assignment daemon 206.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 314 may store a subset of the modules and data structures identified above. Furthermore, memory 314 may store additional modules and data structures not described above.

Although FIG. 3 shows a "server," FIG. 3 is intended more as functional description of the various features that may be present in a set of servers 300 than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers and how features are allocated among them will vary from one implementation to another, and may depend in part on the amount of data traffic that the system must handle during peak usage periods as well as during average usage periods. In some implementations, a subset of the LAD 206, the access data 210, the global state 211, and the placement policies 212 are located on separate servers. For example, the LAD 206 may be located at a server (or set of servers), the access data 210 and the global state 211 may be located and maintained by a statistics server 208 (or a set of statistics servers 208), and the placement policies 212 may be located on another server (or a set of other servers).

FIG. 4 is a block diagram of an instance server 400 for an instance 102, according to some implementations. The instance server 400 typically includes one or more processing units (CPU's) 402 for executing modules, a clock 403 that reports the current date and/or time, programs and/or instructions stored in memory 414 and thereby performing processing operations, one or more network or other communications interfaces 404, memory 414, and one or more communication buses 412 for interconnecting these components. In some implementations, the clock 403 is a local clock that is periodically synchronized with a clock server (e.g., a quorum clock server or any other clock server on a network, etc.). In some implementations, the instance server 400 includes a user interface 406 comprising a display device 408 and one or more input devices 410. In some implementations, memory 414 includes high-speed random access memory, such as DRAM, SRAM, DDR RAM or other random access solid state memory devices. In some implementations, memory 414 includes non-volatile memory, such as one or more magnetic disk storage devices, optical disk storage devices, flash memory devices, or other non-volatile solid state storage devices. In some implementations, memory 414 includes one or more storage devices remotely located from the CPU(s) 402. Memory 414, or alternately the non-volatile memory device(s) within memory 414, comprises a computer readable storage medium. In some implementations, memory 414 or the computer readable storage medium of memory 414 stores the following programs, modules and data structures, or a subset thereof:

an operating system 416 that includes procedures for handling various basic system services and for performing hardware dependent tasks;

a communications module 418 that is used for connecting the instance server 400 to other instance servers or computers via the one or more communication network interfaces 404 (wired or wireless) and one or more communication networks, such as the Internet, other wide area networks, local area networks, metropolitan area networks, and so on;

an optional user interface module 420 that receives commands from the user via the input devices 410 and generates user interface objects in the display device 408;

a replication module 220 and replication queues 222, as described herein;

data stores 224 (e.g., distributed databases, file systems, tape stores, etc.) that store the objects 226; and object metadata 228 and corresponding metadata elements 330-344 as described above with respect to server 300.

Each of the above identified elements may be stored in one or more of the previously mentioned memory devices, and corresponds to a set of instructions for performing a function described above. The set of instructions can be executed by one or more processors (e.g., the CPUs 402). The above identified modules or programs (i.e., sets of instructions) need not be implemented as separate software programs, procedures or modules, and thus various subsets of these modules may be combined or otherwise re-arranged in various implementations. In some implementations, memory 414 may store a subset of the modules and data structures identified above. Furthermore, memory 414 may store additional modules and data structures not described above.

Although FIG. 4 shows an "instance server," FIG. 4 is intended more as functional description of the various features that may be present in a set of instance servers 400 than as a structural schematic of the implementations described herein. In practice, and as recognized by those of ordinary skill in the art, items shown separately could be combined and some items could be separated. For example, some items shown separately in FIG. 4 could be implemented on single servers and single items could be implemented by one or more servers. The actual number of servers and how features are allocated among them will vary from one implementation to another, and may depend in part on the amount of data traffic that the server must handle during peak usage periods as well as during average usage periods. For example, at a single instance 102 there may be a hundred instance servers 400 or thousands of instance servers 400.

In some implementations, to provide faster responses to clients and to provide fault tolerance, each program or process that runs at an instance is distributed among multiple computers. The number of instance servers 400 assigned to each of the programs or processes can vary, and depends on the workload.

Figure 5:
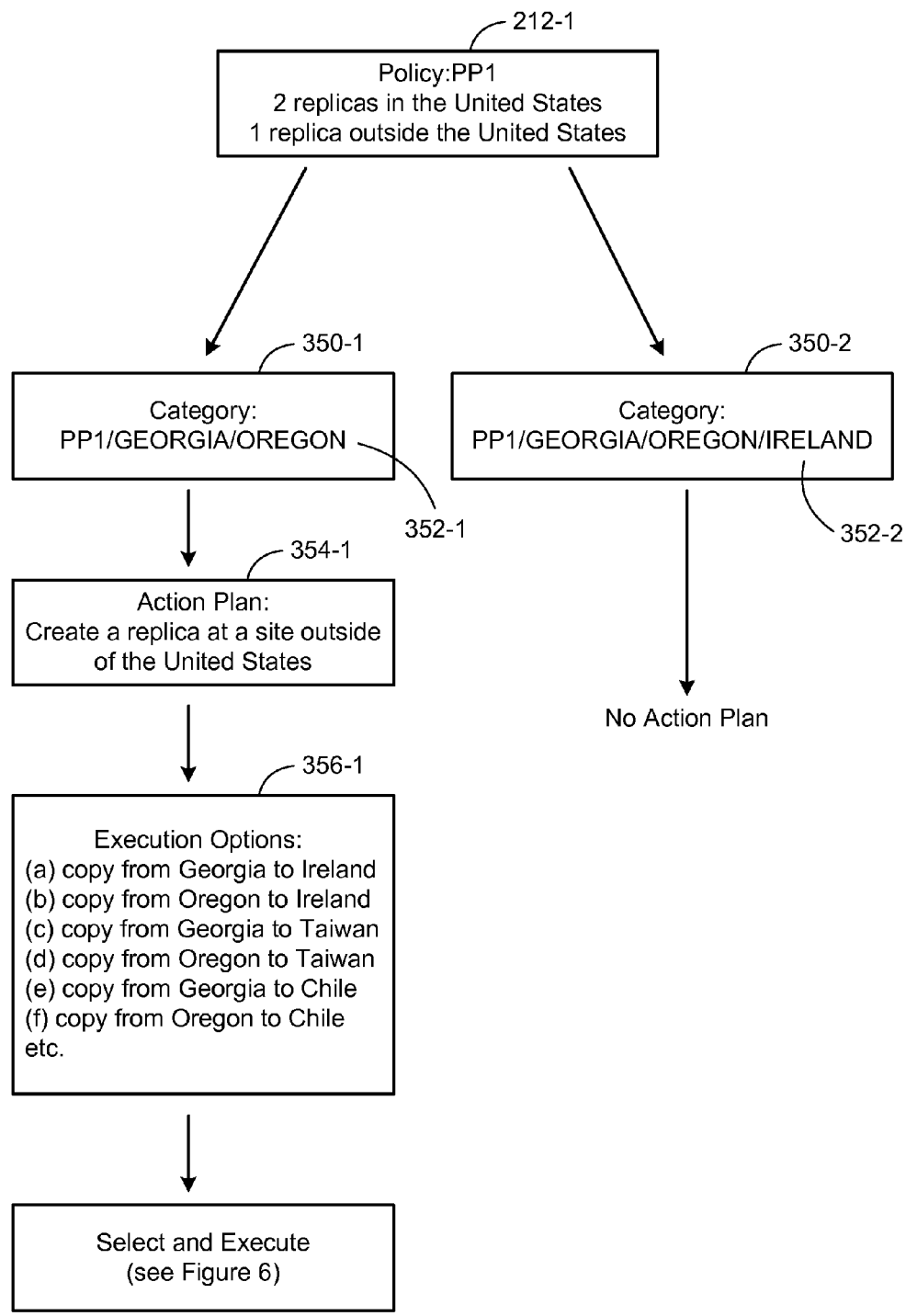
FIGS. 5-7 illustrate placement management techniques based on categorization of objects within a distributed storage system according to some implementations.
Figure 6:
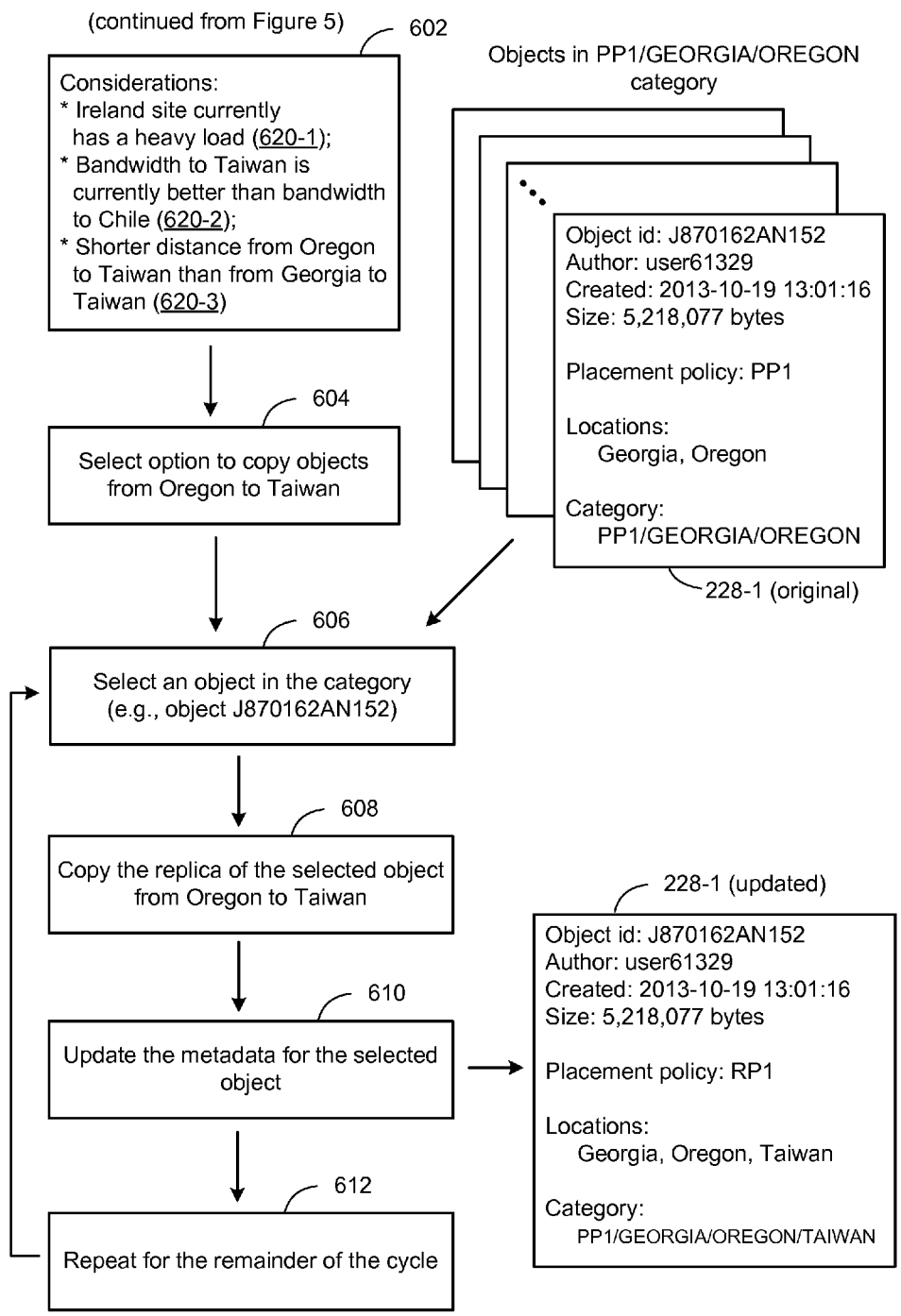
Figure 7:
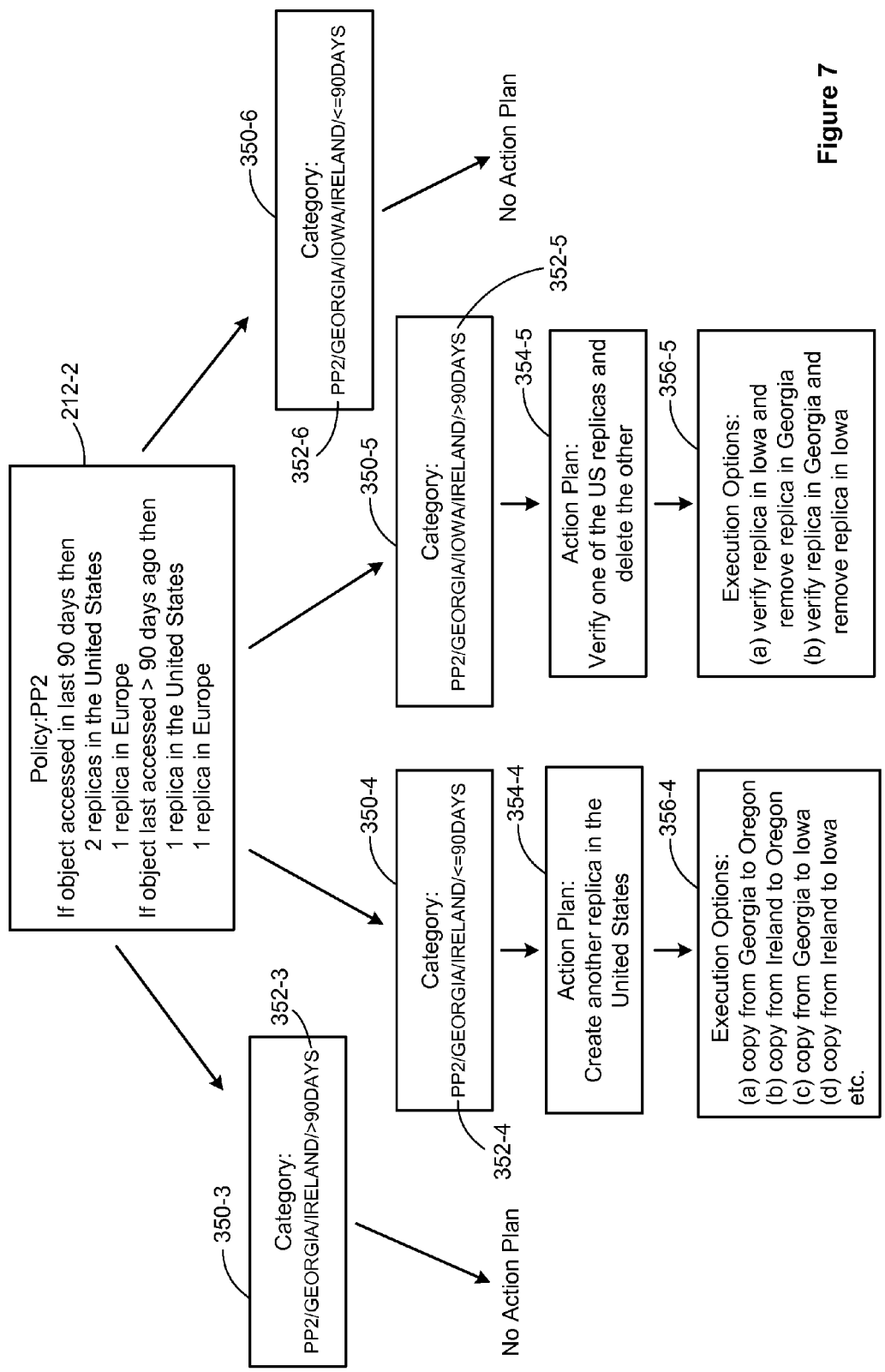

FIGS. 5-7 illustrate processes that use placement categories 350 to efficiently modify the number or locations of object replicas in order to satisfy the placement policies 212. A distributed storage system may have trillions or quadrillions of objects, so attempting to scan the set of objects individually would be prohibitively slow (e.g., taking weeks). However, large sets of the objects may be grouped together based on their identical placement needs. Implementations of the present invention group objects together in categories, where categories 350 are determined by assigned placement policies 338, the current locations of the objects 340, and sometimes the last access time range 344. In contrast to the trillions or quadrillions of objects, there are typically only a few million categories 350, and the objects in most categories already satisfy the placement policy. For example, perhaps only a few thousand placement categories 350 require changes to the placement of replicas. In a "steady-state" condition, most of the objects requiring replication are those new objects that have just been uploaded to the distributed storage system and not yet replicated to the number of instances specified by the placement policy 338.

In FIG. 5, a sample placement policy 212-1 is illustrated. The policy is identified by policy code PP1. For this policy, the target is to have 3 replicas, with 2 replicas in the United States and 1 replica outside the United States. For placement policy 212-1, there are multiple placement categories 350, corresponding to distinct sets of locations where there are replicas of objects. For example, assume there are multiple instances 102 throughout the world, including instances in Georgia, Oregon, and Ireland. (For this example, assume there is only one instance in each of these regions, so that "Georgia," "Oregon," and "Ireland" each identifies a unique instance.) Objects with replicas in all three of these locations are in the category with category ID PP1/GEORGIA/OREGON/IRELAND 352-2. Because objects in this category already satisfy the placement policy 212-1, there is no action plan. In some implementations, this is referred to as an "empty" or "null" action plan.

As illustrated in this example, some implementations construct the category ID for a category using a concatenation of placement policy and locations of object replicas. For example, the category 350-1 with category ID 352-1 concatenates the placement policy code PP1 with location codes GEORGIA and OREGON. In this illustration, the category ID 352-1 also includes the separator "/", but this is not required. Other implementations use a different separator or no separator at all. In addition, some implementations concatenate the elements in a different order, use abbreviations for the placement policy or locations, or include other elements in the construction of the category ID. Because there are many distinct instances in the distributed storage system, implementations typically designate a unique order for the location codes within the category ID to avoid duplication (e.g., GEORGIA sorted before OREGON, so there is only the one category 352-1 PP1/GEORGIA/OREGON and not another category with category ID PP1/OREGON/GEORGIA). Some implementations instead use a system generated object ID, and map each combination of placement policy and set of locations to the proper category ID.

For the category 350-1 with category ID PP1/GEORGIA/OREGON 352-1, there are no object replicas outside the United States, so the policy 212-1 is not satisfied by the objects in this category. The plan module 360 determines the action plan 354-1 to create a replica for each object at an instance outside the United States. For this action plan 354-1, there are multiple execution options 356-1. Each of the execution options 356-1 here specifies both a source for the new replica and the destination for the new replica. In this case, there are two sources (Georgia or Oregon), and many different destination instances outside of the United States, including Ireland, Taiwan, and Chile.

After the plan module 360 identifies the execution options 356-1, the plan module evaluates (602) the network and resource considerations, as shown in FIG. 6. In the illustrated example, the Ireland instance currently has a heavy workload (620-1), so other instances would be better for the creation of new object replicas. In this illustration, the bandwidth to Taiwan is better than the bandwidth to Chile (620-2). For example, a key network link to Chile could be out of service. In addition, the plan module 360 determines that the network links from Oregon to Taiwan are shorter than from Georgia to Taiwan (620-3), so Oregon is a better source for copying objects to Taiwan. Based on these current conditions, the plan module selects (604) the option to copy objects from Oregon to Taiwan. If network or resource availability were different, another option could be selected. For example, two minutes later (or even a few seconds later) the available resources may be different, so a different option could be selected.

Once an execution option 356-1 is selected, the plan module 360 selects (606) an object from the category (see FIGS. 8A and 8B). In the illustration, the object with object ID J870162AN152 is selected. The original metadata 228-1 for this object is shown in FIG. 6. The location assignment daemon 206 issues (608) a command to replicate (608) the selected object from Oregon to Taiwan. When the copy is completed, the metadata 228-1 for the object is updated (610), showing the new set of locations for the object and the new category for the object. The process of selecting and replicating additional objects then repeats (612) for the current processing cycle. In some implementations, each processing cycle is about 2 minutes, and the action plan 354-1 can be applied to hundreds or thousands of objects during that time. If the process runs out of objects corresponding to the selected action plan, then the next highest priority action plan is executed on another category of objects. In some implementations, two or more action plans are executed simultaneously. Some of these implementations limit the resources utilized by the lower priority action plans so that they do not slow down the processing of the higher priority plans. In some implementations, there are two or more threads of execution for the same action plan, but this may be limited by resource availability. For example, attempting to replicate 1000 distinct objects from Oregon to Taiwan simultaneously could overload a network link or server resources at the source or destination. In some implementations, the network and resource considerations are reevaluated (602) during each iteration 612, or after a certain number of iterations (e.g., 10 or 100), or after a certain amount of time (e.g., 10 seconds or 30 seconds). Some implementations evaluate (602) the considerations only once per cycle for each action plan that is being implemented.

At the beginning of each cycle, the plan module 360 determines action plans 354 for each of the categories 350 that require creation or removal of object replicas, and the plan prioritization module 362 assigns priorities to each of those action plans. The plan module also determines the execution options 356 for each of the action plans 354. For the highest priority action plan(s) 354, execution options are selected based on the current network and resource considerations, and object replicas are created or removed according to the selected execution options. Although 2 minutes is a good cycle length for some implementations, the cycle length is typically configurable, and can be longer or shorter depending on size of the distributed storage system, the number of data centers and/or instances, the number of objects, and the available bandwidth between the instances.

FIG. 7 is similar to FIGS. 5 and 6, but illustrates a placement policy 212-2 that has a temperature component. As noted earlier, "temperature" refers to how recently an object has been accessed. Some placement policies 212 specify two or more ranges for when an object was last accessed (e.g., range 1=last 90 days, range 2=more than 90 days), and the number or locations of required replicas can depend on the last access range. In some implementations, if an object is accessed by even one person in the last 90 days, then it would be assigned to the "<=90 Days" last access range. In other implementations, the assigned last access range is computed as an aggregate. For example, computing the number of times an object was accessed in the last 90 days. As a specific example, a policy could specify a certain number of required replicas for objects accessed more than 50 times in the last 90 days, a different number of replicas for objects accessed 5-50 times in the past 90 days, and another number of required replicas for objects accessed less than 5 times in the last 90 days. Some implementations also provide for placement policies 212 that take into account where the objects are accessed from (e.g., if most of the access is in the United States, then keep replicas in the United States, whereas access from Europe would prompt keeping replica(s) in Europe).

When an object's category is based on just placement policy and locations of object replicas, it is very easy to know when the category changes (e.g., when the storage system creates or removes a replica). However, when the category corresponding to an object is based on temperature as well, another process has to recompute the temperature of each object at some regular interval. In some implementations, a background process runs at some interval (e.g., weekly, monthly, or possibly continuously) to calculate the temperature of each object for which temperature is a factor in the placement policy. The background process then updates the last access range 344 for each object and the assigned category 342 as appropriate. In this situation, two objects that have previously been in the same category could be in different categories based on a temperature change for one of the objects, without the creation or removal of any object replicas.

The placement policy 212-2 in FIG. 7 requires three replicas for objects accessed in the past 90 days, but only two replicas if not accessed in the past 90 days. This illustration looks at just four instances, identified as Georgia, Iowa, Oregon, and Ireland. For the category 350-6 with object ID PP2/GEORGIA/IOWA/IRELAND/<=90DAYS, the replicas in Georgia, Iowa, and Ireland satisfy the placement policy because the object has been accessed in the past 90 days and there are three replicas satisfying the location requirement. For the category 350-3 with object ID PP2/GEORGIA/IRELAND/>90DAYS 352-3, the current object replicas in Georgia and Ireland satisfy the policy because the object has not been accessed in the past 90 days. Thus, these categories 350-3 and 350-6 have no action plan (or a null action plan).

For the other two categories 350-4 and 350-5, the action plans have opposite effects: adding a replica versus removing a replica. For the category 350-4 with object ID PP2/GEORGIA/IRELAND/<=90DAYS 352-4, there are only two replicas, but the policy 212-2 requires a third replica (in the United States). Therefore, the action plan 354-4 for this category is to create another replica in the United States. As illustrated, the possible execution options 356-4 include copying from Georgia to Oregon, copying from Ireland to Oregon, copying from Georgia to Iowa, and copying from Ireland to Iowa. When the action plan 354-4 is selected, one of the execution options 356-4 would be selected based on network and resource considerations.

On the other hand, objects in the category 350-5 have not been accessed in the past 90 days. As the category ID PP2/GEORGIA/IOWA/IRELAND/>90DAYS 352-5 indicates, the objects are in Georgia, Iowa, and Ireland, but only two replicas are required because of the lack of access in the past 90 days. According to the policy, one of the replicas in the United States should be deleted. As illustrated, the action plan 354-5 is to verify one of the replicas in the United States and remove the other United States replica. As this example shows, some implementations require verification of a replica before removing another replica. For example, suppose the replica of an object in Georgia has been corrupted, but the replicas in Iowa and Ireland are fine. If the replica in Iowa were removed, there would only be one good copy remaining Verification at one site before deletion at another site mitigates this problem. (Of course the verified replica of an object could become corrupted immediately after the verification, or the instance storing the verified object could have an outage, but these are known issues.) The execution options 356-5 here are to either verify the replica in Iowa and remove the replica in Georgia or verify the replica in Georgia and remove the replica in Iowa. Some implementations would also include execution options for verifying the replica in Ireland and then removing either of the other two replicas.

FIGS. 8A and 8B illustrate two ways to identify the objects that correspond to each category. In FIG. 8A, once the category has been determined for an object, the (category ID, object ID) pair is inserted into an indexed table. Then, a simple query for the category ID returns all of the objects in that category (or just the top 1, top 10, or top n for some positive integer n). FIG. 8A illustrates at least three object ID's 330-1, 330-2, and 330-3 corresponding to the category ID 352-1, and at least one object ID 330-4 corresponding to the category ID 352-2.

FIG. 8B achieves the same objective by creating a linked list for each of the categories 350. FIG. 8B illustrates one category ID 352-1, pointing to the first object ID 330-1 associated with the category ID 352-1. In the linked list, the object ID 330-1 has a corresponding link 802 to the next object ID 330-2 in the list, which is associated with a link 802 to the next object ID 330-3, and so on. In this implementation, the object ID's are not necessarily in object ID order, or any particular order at all. In general, the selection of an object in a category (FIG. 6, step 606) is arbitrary—the objects are all in the same category, and all have the same placement needs, so there are no objects within the category that have a higher priority than any other objects. Implementations that do prioritize the processing of objects typically use the method illustrated in FIG. 8A, adding one or more additional columns to capture the priority.

Figure 9A:
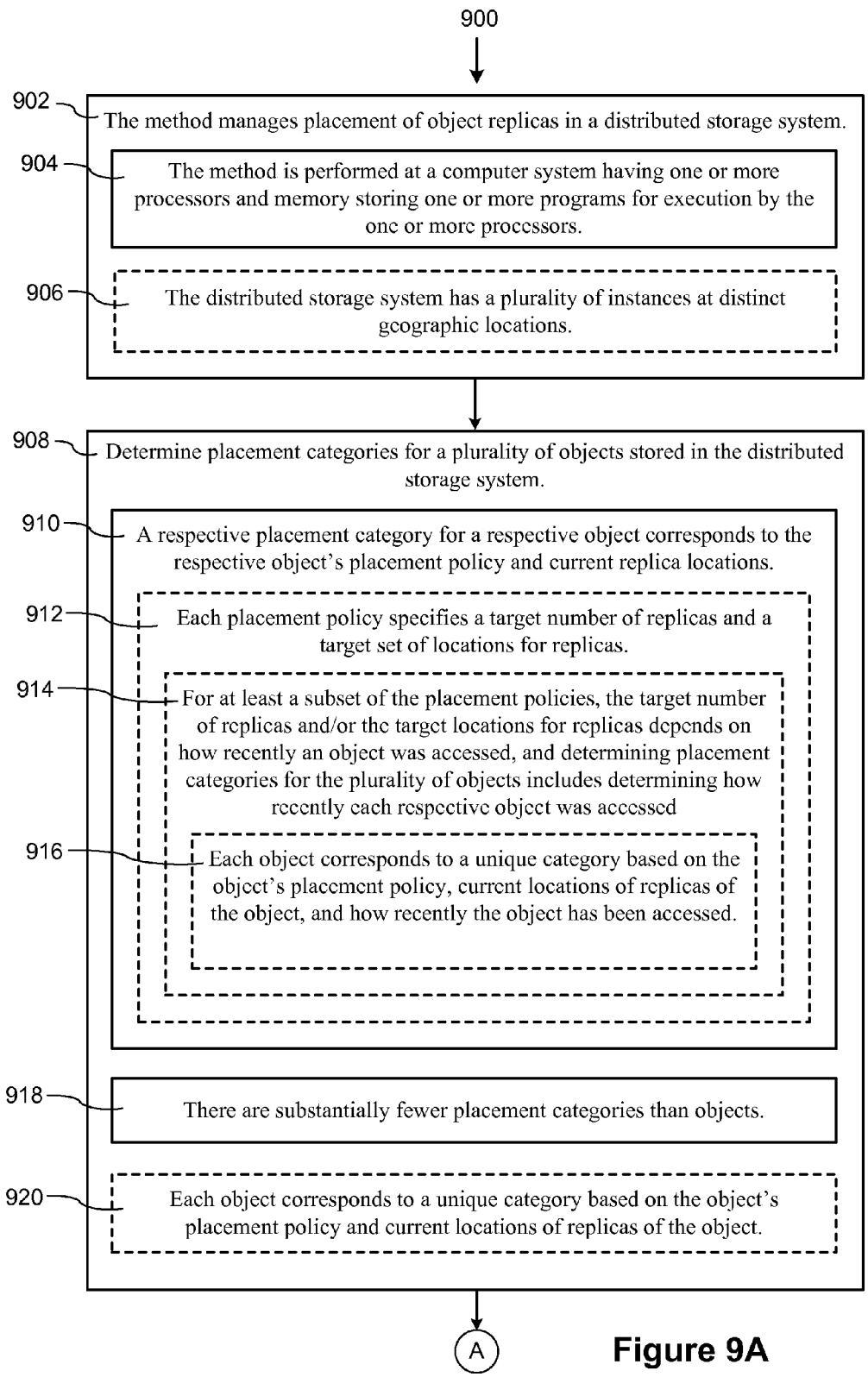
FIGS. 9A-9C illustrate a method of managing placement of object replicas in a distributed storage system according to some implementations.
Figure 9B:
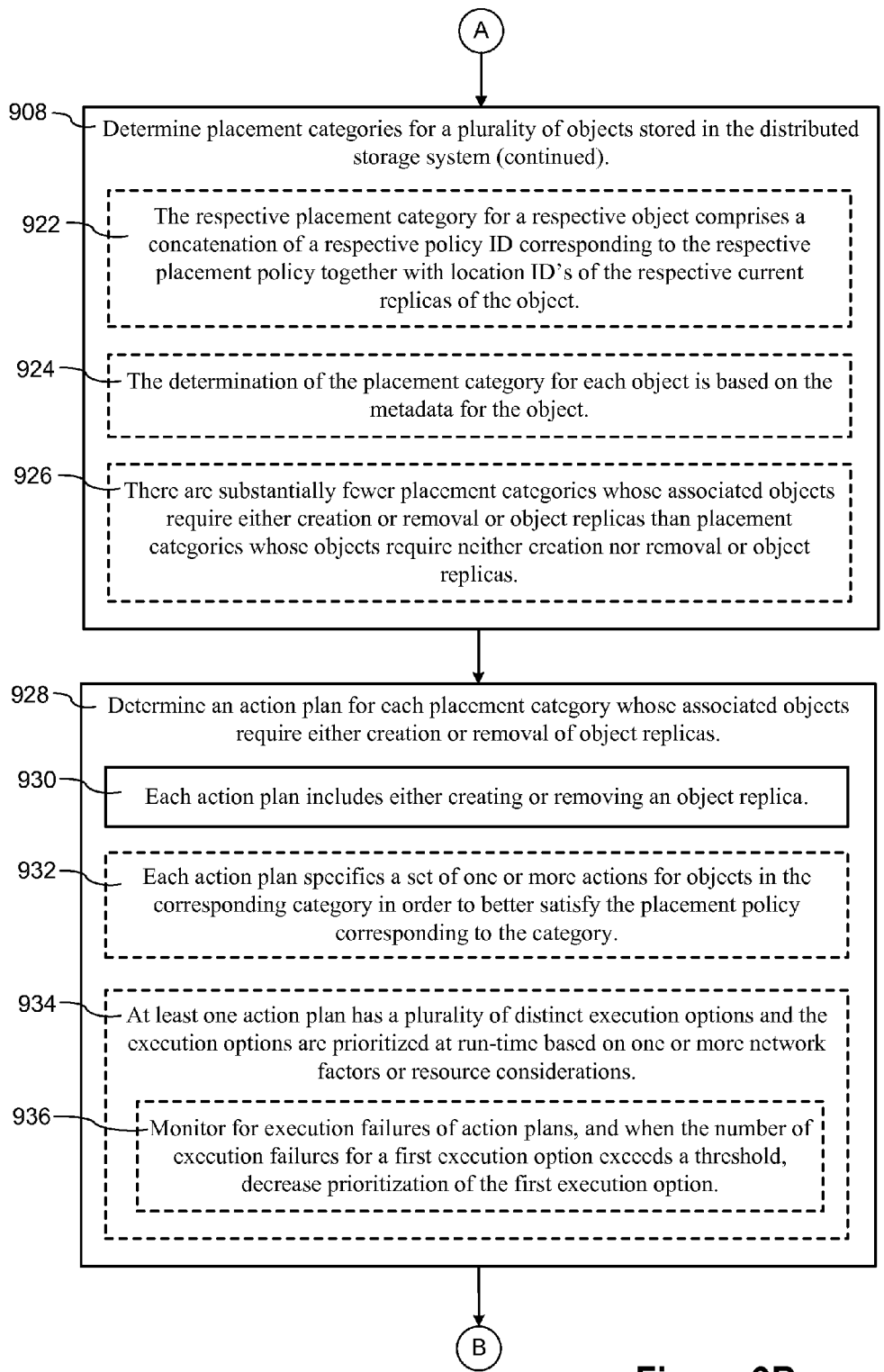
Figure 9C:
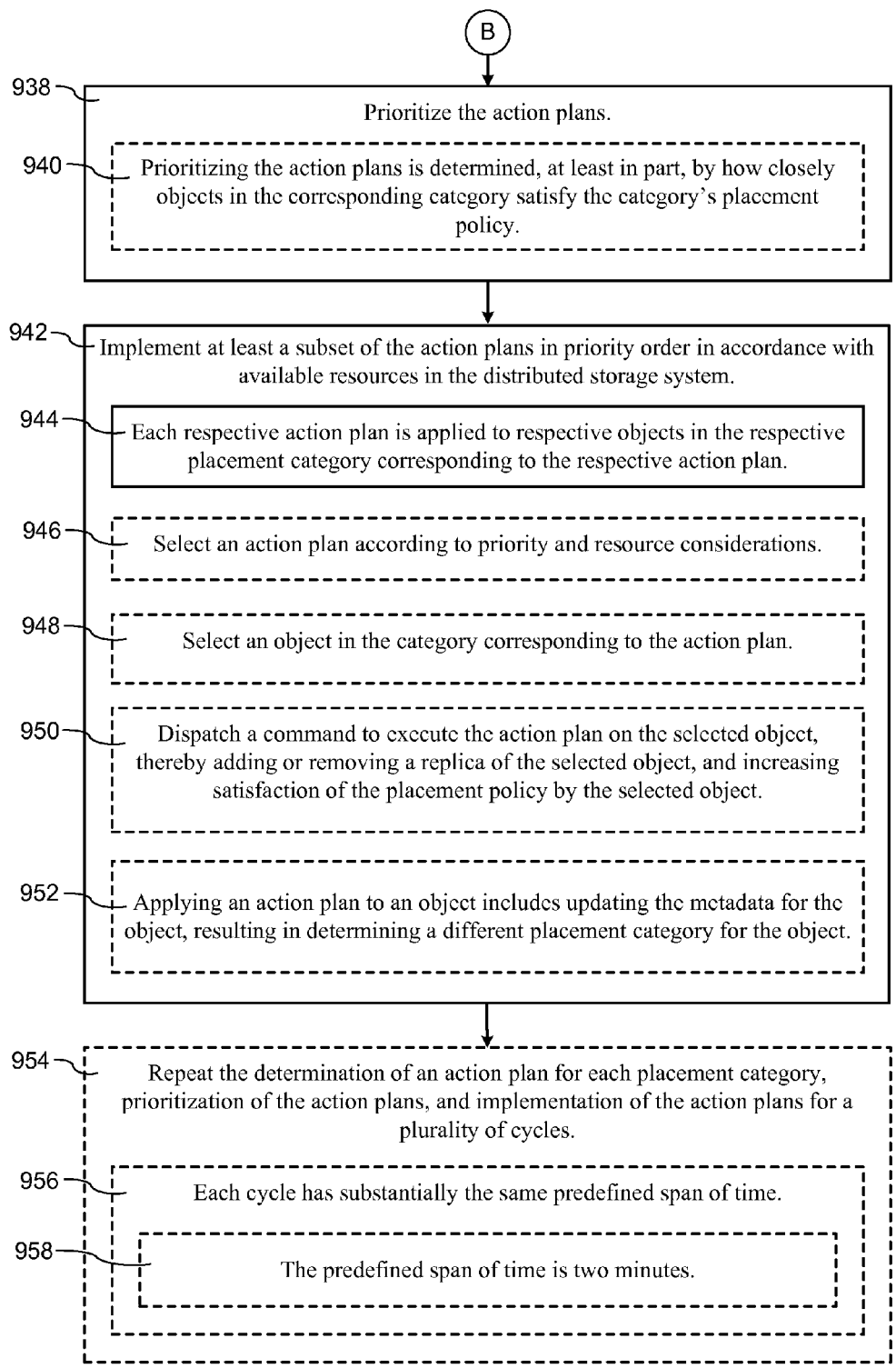

FIGS. 9A-9C illustrate a method 900 of managing (902) placement of object replicas in a distributed storage system according to some implementations. The method is performed (904) at a computer system having one or more processors and memory, and the memory stores one or more programs for execution by the one or more processors. In some implementations, the method 900 is performed by location assignment daemon 206 or plan module 360. In some implementations, the distributed storage system has (906) a plurality of instances. In some of these implementations, the plurality of instances are at distinct geographic locations. In some implementations, each instance corresponds to a data center. In some implementations, each data center comprises one or more instances.

The method 900 determines (908) placement categories 350 for a plurality of objects stored in the distributed storage system 200 (e.g., all of the objects that have corresponding placement policies 212). A respective placement category 350 for a respective object corresponds to (910) the respective object's placement policy 338 and current replica locations 340. In some implementations, each placement policy 212 specifies (912) a target number of replicas and a target set of locations for replicas. In some implementations, at least a subset of the placement policies specify (914) the target number of replicas and/or the target locations for replicas based on how recently an object was accessed, and determine placement categories 342 for the plurality of objects based on how recently each respective object was accessed. In some of these implementations, each object corresponds to (916) a unique category 342 based on the object's placement policy 338, current locations 340 of replicas of the object, and how recently the object has been accessed 344.

Because multiple objects are typically determined to be in each of the categories, there are (918) substantially fewer placement categories 350 than objects 226. For example, there may be a few million categories, but trillions or quadrillions of individual objects 226.

When placement policies 212 do not have different replica requirements based on how recently the objects have been accessed, each object typically corresponds to (920) a unique category based on the object's placement policy 338 and current locations 340 of replicas of the object 226. As explained above with respect to FIGS. 5 and 7, in some implementations, the respective placement category 342 for a respective object 226 comprises (922) a concatenation of a respective policy ID corresponding to the respective placement policy 338 together with location ID's 340 of the respective current replicas of the object. In general, the determination of the placement category 342 for each object 226 is based on (924) the metadata 228 for the object. As illustrated above in FIG. 6, when the relevant metadata 228 for an object 226 changes, the corresponding category 342 changes as well.

In general, at any given time, the vast majority of the objects in distributed storage systems according to the present invention satisfy their placement policies (e.g., 99.99%). By categorizing the objects 226, the objects that do require additional replicas (or replica removal) are identified quickly, and actions taken to better satisfy the policies. In fact, in some implementations, there are (926) substantially fewer placement categories 350 whose associated objects 226 require either creation or removal or object replicas than placement categories 350 whose objects 226 require neither creation nor removal or object replicas.

The plan module 360 determines (928) an action plan for each placement category whose associated objects require either creation or removal of object replicas. For the categories 350 whose objects 226 already satisfy their placement policy 212, there is no action plan (or an empty action plan in some implementations). Each action plan includes (930) either creating or removing an object replica. In some cases, an action plan includes both creation and deletion of object replicas (e.g., if an assigned policy 338 changes in a way that results in at least one object replica being in the "wrong" location). In some implementations, each action plan 354 specifies (932) a set of one or more actions for objects 226 in the corresponding category 350 in order to better satisfy the placement policy 212 corresponding to the category 350. In some implementations, at least one action plan 354 has (934) a plurality of distinct execution options 356 and the execution options 356 are prioritized (934) at run-time based on one or more network factors or resource considerations. Network factors and resource considerations include available bandwidth to each instance, the cost of utilizing the available bandwidth, available storage capacity at each instance, available processing resources at each instance (e.g., instance servers), the proximity of each potential source instance to each potential target instance (when copying a replica from source to destination), historical data regarding the reliability of each instance, etc. In some implementations, the plan module 360 monitors for execution failures of action plans, and when the number of execution failures for an execution option 356 exceeds a threshold, the plan module 360 decrease prioritization of that execution option 356.

The plan prioritization module 362 prioritizes (938) the action plans 354. There are various reasons for one action plan to have a higher priority than another action plan. For example, an action plan to create a new object replica typically has priority over an action plan to remove a replica. As another example, an action plan to create a second replica of an object would typically have priority over an action plan to create a third replica of an object. As a third example, an action plan to create another required replica would typically have a higher priority than an action plan to move a replica from one instance to another instance. In some implementations, prioritizing the action plans is determined (940), at least in part, by how closely objects in the corresponding category satisfy the category's placement policy. For example, an action plan 354-7 for a category 350-7 whose objects nearly satisfy the relevant placement policy 212-7 are lower in priority than an action plan 354-8 for a category 350-8 whose objects are not close to satisfying the relevant placement policy 212-8.

Once the action plans 354 are created and prioritized, the location assignment daemon 206 implements (942) at least a subset of the action plans 354 in priority order in accordance with available resources in the distributed storage system. This was illustrated above with respect to FIG. 6. Each respective action plan 354 is applied (944) to respective objects 226 in the respective placement category 350 corresponding to the respective action plan 354. In some implementations, the location assignment daemon 206 selects (946) an action plan according to priority and resource considerations. After selecting an action plan 354 and an execution option 356 for the selected action plan 354, some implementations select (948) an object 226 in the category 350 corresponding to the action plan 354. After selecting an object 226, the LAD 206 dispatches (950) a command to execute the action plan 354 on the selected object 226, thereby adding or removing a replica of the selected object, and increasing satisfaction of the placement policy 212 by the selected object 226. In some implementations, applying an action plan 354 to an object 226 includes (952) updating the metadata for the object, resulting in determining a different placement category for the object.

Although the discussion above has identified one order for the operations, the specific order recited is not required. For example, the network and resource considerations could be evaluated after selecting an object in the selected category. In fact, the evaluation of the available resources and the selection of an execution option can occur in parallel with the selection of an object in the category. Alternatively, the process 900 may select a batch of objects, which can occur before, during, or after the evaluation of network and resource considerations or selection of an execution option.

In some implementations, the process 900 repeats (954) the determination of an action plan 354 for each placement category 350, prioritization of the action plans 354, and implementation of the action plans 354 for a plurality of cycles. Typically, the determination of the action plans and prioritization of the action plans occurs once per cycle, and the remaining time is devoted to implementing the action plans in priority order. In some implementations, the network and resource considerations are evaluated no more than once per category within a cycle. In other implementations, the network and resource considerations are evaluated at certain intervals within each cycle (e.g., after a certain amount of time, such as 15 seconds, or after a certain number of objects have been processed, such as 1000 objects). In some implementations, each cycle has (956) substantially the same predefined span of time. In some implementations, the predefined span of time is (958) 2 minutes. In some implementations, the span of time for each cycle is determined empirically based on how well the objects are satisfying the placement policies. For example, is the cycle time is too short, then too much time may be spent on overhead processing. On the other hand, if the cycle is too long, then objects that are newly uploaded to the distributed storage system 200 may experience a longer delay before replication to second and third instances. In some implementations, the span of time for each cycle is a function of other factors, such as time of day.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A computer-implemented method for managing placement of object replicas in a distributed storage system, comprising:
at a computer system having one or more processors and memory storing one or more programs for execution by the one or more processors:
receiving a plurality of objects and storing one or more replicas of each of the objects at locations within the distributed storage system;
identifying a plurality of placement policies, wherein each placement policy is assigned to a respective plurality of the received plurality of objects, and each placement policy specifies a respective target number of object replicas and specifies a respective target set of locations for object replicas;
for each placement policy:
dynamically partitioning the objects assigned to the respective placement policy into a plurality of placement categories, wherein each placement category consists of all objects having a same respective set of current object replica locations;
determining an action plan for each placement category whose objects require either creation or removal of object replicas, wherein each action plan includes either creating or removing an object replica for each of the objects in the respective placement category;
prioritizing the action plans; and
implementing at least a subset of the action plans in priority order in accordance with available resources in the distributed storage system, wherein a respective action plan is applied to respective objects in the respective placement category corresponding to the respective action plan.

2. The computer-implemented method of claim 1, wherein the distributed storage system has a plurality of instances.

3. The computer-implemented method of claim 2, wherein the plurality of instances are at distinct geographic locations.

4. The computer-implemented method of claim 1, wherein, for at least a subset of the placement policies, the target number of object replicas or the target set of locations for object replicas depends on how recently an object was accessed, and wherein dynamically partitioning the objects is further based on how recently each respective object was accessed.

5. The computer-implemented method of claim 1, wherein each object has a respective placement category that comprises a concatenation of a respective policy identifier corresponding to the respective placement policy together with location identifiers of the respective current replicas of the object.

6. The computer-implemented method of claim 1, wherein each action plan specifies a set of one or more actions for objects in the corresponding placement category in order to better satisfy the placement policy corresponding to the placement category.

7. The computer-implemented method of claim 1, wherein prioritizing the action plans is determined, at least in part, by how closely objects in the corresponding placement category satisfy the placement policy corresponding to the placement category.

8. The computer-implemented method of claim 1, wherein implementing at least a subset of the action plans comprises:
 selecting an action plan according to priority and resource considerations;
 selecting an object in the placement category corresponding to the action plan; and
 dispatching a command to execute the action plan on the selected object, thereby adding or removing a replica of the selected object, and increasing satisfaction of the placement policy by the selected object.

9. The computer-implemented method of claim 1, wherein dynamically partitioning the objects into placement categories is based on metadata for the objects.

10. The computer-implemented method of claim 1, wherein the determination of an action plan for each placement category, prioritization of the action plans, and implementation of the action plans is repeated for a plurality of cycles.

11. The computer-implemented method of claim 1, wherein at least one action plan has a plurality of distinct execution options and the execution options are prioritized at run-time based on one or more network factors or resource considerations.

12. The computer-implemented method of claim 11, further comprising monitoring for execution failures and when the number of execution failures for a first execution option exceeds a threshold, decreasing prioritization of the first execution option.

13. The computer-implemented method of claim 1, wherein applying an action plan to an object includes updating metadata for the object, resulting in assigning the object to a different placement category.

14. The computer-implemented method of claim 1, wherein there are fewer placement categories whose assigned objects require either creation or removal of object replicas than placement categories whose assigned objects require neither creation nor removal of object replicas.

15. A computer system for managing placement of object replicas in a distributed storage system, comprising:
 one or more processors;
 memory; and
 one or more programs stored in the memory, the one or more programs comprising instructions for:
  receiving a plurality of objects and storing one or more replicas of each of the objects at locations within the distributed storage system;
  identifying a plurality of placement policies, wherein each placement policy is assigned to a respective plurality of the received plurality of objects, and each placement policy specifies a respective target number of object replicas and specifies a respective target set of locations for object replicas;
  for each placement policy:
   dynamically partitioning the objects assigned to the respective placement policy into a plurality of placement categories, wherein each placement category consists of all objects having a same respective set of current object replica locations;
   determining an action plan for each placement category whose objects require either creation or removal of object replicas, wherein each action plan includes either creating or removing an object replica for each of the objects in the respective placement category;
   prioritizing the action plans; and
   implementing at least a subset of the action plans in priority order in accordance with available resources in the distributed storage system, wherein a respective action plan is applied to respective objects in the respective placement category corresponding to the respective action plan.

16. A non-transitory computer readable storage medium storing one or more programs configured for execution by one or more processors of a computer system to manage placement of object replicas in a distributed storage system, the one or more programs comprising instructions for:
 receiving a plurality of objects and storing one or more replicas of each of the objects at locations within the distributed storage system;
 identifying a plurality of placement policies, wherein each placement policy is assigned to a respective plurality of the received plurality of objects, and each placement policy specifies a respective target number of object replicas and specifies a respective target set of locations for object replicas;
 for each placement policy:
  dynamically partitioning the objects assigned to the respective placement policy into a plurality of placement categories, wherein each placement category consists of all objects having a same respective set of current object replica locations;
 determining an action plan for each placement category whose objects require either creation or removal of object replicas, wherein each action plan includes either creating or removing an object replica for each of the objects in the respective placement category;
 prioritizing the action plans; and
 implementing at least a subset of the action plans in priority order in accordance with available resources in the distributed storage system, wherein a respective action plan is applied to respective objects in the respective placement category corresponding to the respective action plan.

* * * * *